(12) United States Patent
Kolz et al.

(10) Patent No.: US 12,316,797 B2
(45) Date of Patent: May 27, 2025

(54) MAGNET BALL TABLE TOP SWIVEL TILT STAND FOR ELECTRONIC DISPLAYS

(71) Applicant: LEGRAND AV INC., Eden Prairie, MN (US)

(72) Inventors: Justin Kolz, Eden Prairie, MN (US); Aaron Grulkowski, Eden Prairie, MN (US)

(*) Notice: Subject to any disclaimer, the term of this patent is extended or adjusted under 35 U.S.C. 154(b) by 460 days.

(21) Appl. No.: 17/639,875

(22) PCT Filed: Aug. 31, 2020

(86) PCT No.: PCT/US2020/048815
§ 371 (c)(1),
(2) Date: Mar. 2, 2022

(87) PCT Pub. No.: WO2021/045999
PCT Pub. Date: Mar. 11, 2021

(65) Prior Publication Data
US 2022/0337690 A1    Oct. 20, 2022

Related U.S. Application Data

(60) Provisional application No. 62/895,929, filed on Sep. 4, 2019.

(51) Int. Cl.
*H04M 1/04* (2006.01)
*F16M 11/14* (2006.01)

(52) U.S. Cl.
CPC .............. *H04M 1/04* (2013.01); *F16M 11/14* (2013.01)

(58) Field of Classification Search
CPC ................................ H04M 1/04; F16M 11/14
See application file for complete search history.

(56) References Cited

U.S. PATENT DOCUMENTS

| | | | |
|---|---|---|---|
| 9,470,356 B1* | 10/2016 | Zaloom .................. | F16M 11/28 |
| 11,421,814 B2* | 8/2022 | Affentranger .......... | A47B 23/04 |
| 2004/0118985 A1 | 6/2004 | Omps | |
| 2014/0110541 A1* | 4/2014 | Hoe ....................... | F16M 11/02 |
| | | | 403/104 |

(Continued)

FOREIGN PATENT DOCUMENTS

AU  2020/341349 A1  4/2022
BR  11 2022 004074 A2  8/2022

(Continued)

OTHER PUBLICATIONS

International Search Report and Written Opinion for PCT/US2020/048815, mailed Dec. 11, 2020 (11 pgs).

(Continued)

*Primary Examiner* — Raymond S Dean
(74) *Attorney, Agent, or Firm* — Bradley J. Thorson; DeWitt LLP

(57) ABSTRACT

Provided is a stand and docking system, wherein a portable electronic device is easily attached and detached from the stand and the display of the portable electronic device is positionable over a wide range of travel in pitch, roll, and yaw. A stand for an electronic display device includes a base assembly having a non-magnetic bearing cup defining an upwardly facing rounded recess presenting a smooth upwardly facing surface and an opposing lower surface, and an attractor bowl made from ferrous material disposed proximate the lower surface, and a docking assembly having a cup interface presenting a smooth rounded outer surface portion conformingly shaped to the recess of the bearing cup, a securing magnet, and a device interface adapter adapted to receive the electronic display device.

23 Claims, 13 Drawing Sheets

(56) References Cited

U.S. PATENT DOCUMENTS

| | | | |
|---|---|---|---|
| 2015/0241919 A1* | 8/2015 | Beatty | G06F 1/1632 |
| | | | 361/679.44 |
| 2015/0301339 A1* | 10/2015 | Harris | G06T 3/602 |
| | | | 248/441.1 |
| 2015/0366336 A1 | 12/2015 | Wong | |
| 2016/0003270 A1* | 1/2016 | Franklin | H01R 13/70 |
| | | | 439/529 |
| 2016/0150067 A1 | 5/2016 | Khaliqi | |
| 2017/0152882 A1* | 6/2017 | Geller | F16M 11/14 |
| 2017/0170860 A1 | 6/2017 | Tiller et al. | |
| 2017/0205023 A1* | 7/2017 | Wynalda, Jr. | A01M 31/025 |
| 2018/0013271 A1 | 1/2018 | Goulden et al. | |
| 2018/0259119 A1 | 9/2018 | Zhu | |

FOREIGN PATENT DOCUMENTS

| | | |
|---|---|---|
| CA | 3153249 A1 | 3/2021 |
| CN | 205573814 U | 9/2016 |
| EP | 4010778 A1 | 6/2022 |
| JP | 2022 546599 A | 11/2022 |

OTHER PUBLICATIONS

United Kingdom Examination Report for Application No. GB2203668.5, dated Feb. 14, 2023 (2 pgs).

Examination Report under Section 18(3) for United Kingdom application No. GB2203668.5, dated Nov. 9, 2023 (1 pg).

Extended European Search Report for application No. 20860224.3, dated Jul. 27, 2023 (8 pgs).

Notification of Reasons for Rejection for Japanese application No. 2022-514722, dated Jul. 2, 2024, including English Translation (9 pgs).

Mexican Patent Office, Notice of Allowance for corresponding Mexican Patent Application No. MX/a/2022/002664 dated Dec. 10, 2024, 3 pages.

* cited by examiner ively slidable in the bearing cup to enable selective positioning of the cup interface relative to the base assembly in roll, pitch, and yaw, and the securing magnet attracts the attractor cup to secure the docking assembly in engagement with the base assembly.

MAGNET BALL TABLE TOP SWIVEL TILT STAND FOR ELECTRONIC DISPLAYS

RELATED APPLICATIONS

The present application claims priority to PCT Application No. PCT/US2020/048815, entitled MAGNET BALL TABLE TOP SWIVEL TILT STAND FOR ELECTRONIC DISPLAYS, filed Aug. 31, 2020, and claims the benefit of U.S. Provisional Patent Application No. 62/895,929, entitled MAGNET BALL TABLE TOP SWIVEL TILT STAND FOR ELECTRONIC DISPLAYS, filed Sep. 4, 2019, said-application-being which are both hereby fully incorporated herein by reference in their entirety.

TECHNICAL FIELD

The present invention relates to stands for electronic displays. In particular, the invention relates to desktop stands for smart electronic displays.

BACKGROUND

Smart electronic devices such as tablets and phones have become ever more popular. While these devices are designed to be portable and hand-held, it is sometimes desirable to have the device supported upright on a desk or tabletop so that the user can view the display while performing other tasks or to participate in video calls or view a presentation.

Existing prior art stands and docking systems are generally cumbersome and require complicated procedures for detaching the device from the stand when it is desired to take the device off the stand. Also, the prior art devices offer limited positioning capability, making it difficult to orient the display of the portable electronic device in an advantageous position for viewing. What is needed is a stand that enables easy attachment and detachment of the portable electronic device and full motion positionability.

SUMMARY

The present invention addresses the drawbacks of the prior art by providing a stand and docking system wherein a portable electronic device is easily attached and detached from the stand and the display of the portable electronic device is positionable over a wide range of travel in pitch, roll, and yaw.

According to embodiments of the invention, a stand for an electronic display device includes a base assembly having a non-magnetic bearing cup defining an upwardly facing rounded recess presenting a smooth upwardly facing surface and an opposing lower surface, and an attractor bowl made from ferrous material disposed proximate the lower surface. A docking assembly has a cup interface presenting a smooth rounded outer surface portion conformingly shaped to the recess of the bearing cup, a securing magnet, and a device interface adapter adapted to receive the electronic display device, wherein the rounded outer surface portion of the cup interface is received in the recess of the bearing cup and is slidable on the smooth upper surface of the bearing cup to enable selective positioning of the cup interface relative to the base assembly in roll, pitch, and yaw, and the securing magnet attracts the attractor cup to secure the docking assembly in engagement with the base assembly.

In embodiments, the stand can further include at least one device interface magnet adapted to attract the electronic display device to hold the electronic display device in engagement with the device interface adaptor. The at least one device interface magnet and/or the securing magnet may be high strength neodymium magnets.

In embodiments, the base assembly of the stand may further include a plastic base operably coupled to the bearing cup, the attractor bowl disposed between the bearing cup and the plastic base.

The stand can enable the electronic display, when attached to the device interface adapter, to be selectively shiftable in a range of about +/−50 degrees of pitch, about +/−25 degrees of roll, and/or about 360 degrees of yaw relative to the base assembly.

In embodiments of the invention, a docking system for a portable electronic device includes a base including a non-magnetic bearing cup and an attractor bowl made from ferrous material disposed proximate a lower surface of the bearing cup, and a docking assembly including a cup interface slidably mated with the bearing cup so as to form a ball and socket connection, the docking assembly further including a securing magnet and a device interface adapted to receive the portable electronic device, the securing magnet magnetically attracting the attractor bowl to retain the cup interface in engagement with the bearing cup, the cup interface selectively slidable in the bearing cup to enable selective positioning of the bearing cup relative to the base assembly in roll, pitch, and yaw. The docking assembly can further include at least one device interface magnet adapted to attract the portable electronic device to hold the portable electronic device in engagement with the docking assembly.

In embodiments, the at least one device interface magnet and/or the securing magnet may be a high strength neodymium magnet. The system can further include a plastic base operably coupled to the bearing cup, the attractor bowl disposed between the bearing cup and the plastic base.

In embodiments, the system can enable the portable electronic device to be selectively shiftable in a range of about +/−50 degrees of pitch, about +/−25 degrees of roll, and/or about 360 degrees of yaw relative to the base assembly.

In further embodiments, a portable electronic display system includes a portable electronic device and a docking system for receiving the portable electronic device. The docking system includes a base having a non-magnetic bearing cup and an attractor bowl made from ferrous material disposed proximate a lower surface of the bearing cup, and a docking assembly including a cup interface slidably mated with the bearing cup so as to form a ball and socket connection, the docking assembly further including a securing magnet and a device interface receiving the portable electronic device, the securing magnet magnetically attracting the attractor bowl to retain the cup interface in engagement with the bearing cup, the cup interface selectively slidable in the bearing cup to enable selective positioning of the bearing cup relative to the base assembly in roll, pitch, and yaw. The docking assembly can further include at least one device interface magnet adapted to attract the portable electronic device to hold the portable electronic device in engagement with the docking assembly. The portable electronic device, when attached to the docking assembly, can be selectively shiftable in a range of about +/−50 degrees of pitch, about +/−25 degrees of roll, and/or about 360 degrees of yaw relative to the base.

According to embodiments, a portable electronic display system includes a portable electronic device; and a docking system for receiving the portable electronic device. The docking system includes a base including an attractor bowl made from ferrous material, and a docking assembly including a cup interface slidably mated with the attractor bowl so as to form a ball and socket connection, the docking assembly further including a securing magnet and a device interface receiving the portable electronic device, the securing magnet magnetically attracting the attractor bowl to retain the cup interface in engagement with the bearing cup, the cup interface selectively slidable in the bearing cup to enable selective positioning of the bearing cup relative to the base assembly in roll, pitch, and yaw. The docking assembly can further include at least one device interface magnet adapted to attract the portable electronic device to hold the portable electronic device in engagement with the docking assembly.

In embodiments, a docking stand for a portable electronic device includes a base including an attractor bowl made from ferrous material, and a docking assembly including a cup interface slidably mated with the attractor bowl so as to form a ball and socket connection, the docking assembly further including a securing magnet and a device interface receiving the portable electronic device, the securing magnet magnetically attracting the attractor bowl to retain the cup interface in engagement with the bearing cup, the cup interface selectively slidable in the bearing cup to enable selective positioning of the bearing cup relative to the base assembly in roll, pitch, and yaw.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
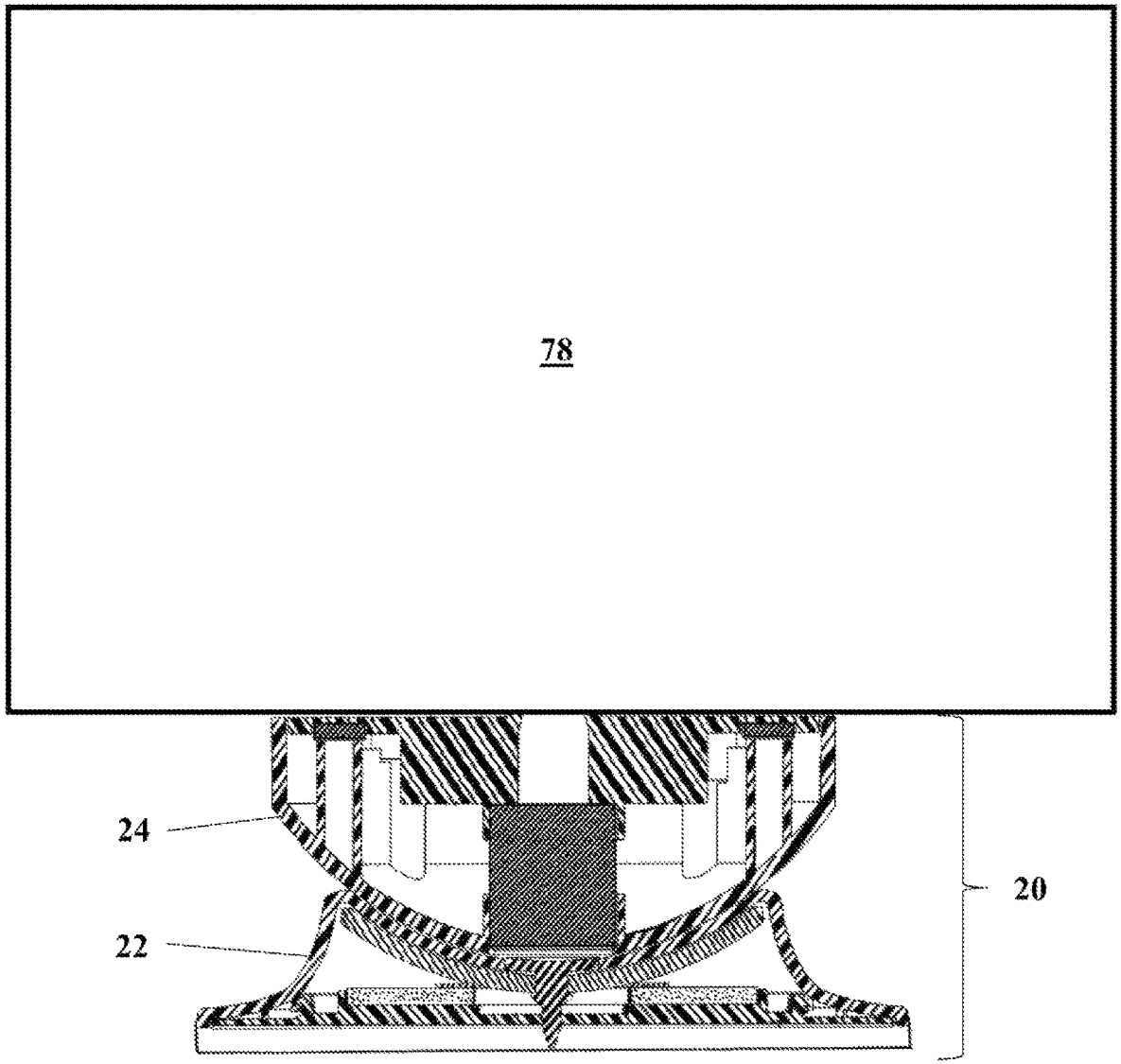
FIG. 1 is a depiction of an electronic device coupled with a stand according to an embodiment of the invention, wherein the stand is depicted in partial cross-section.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
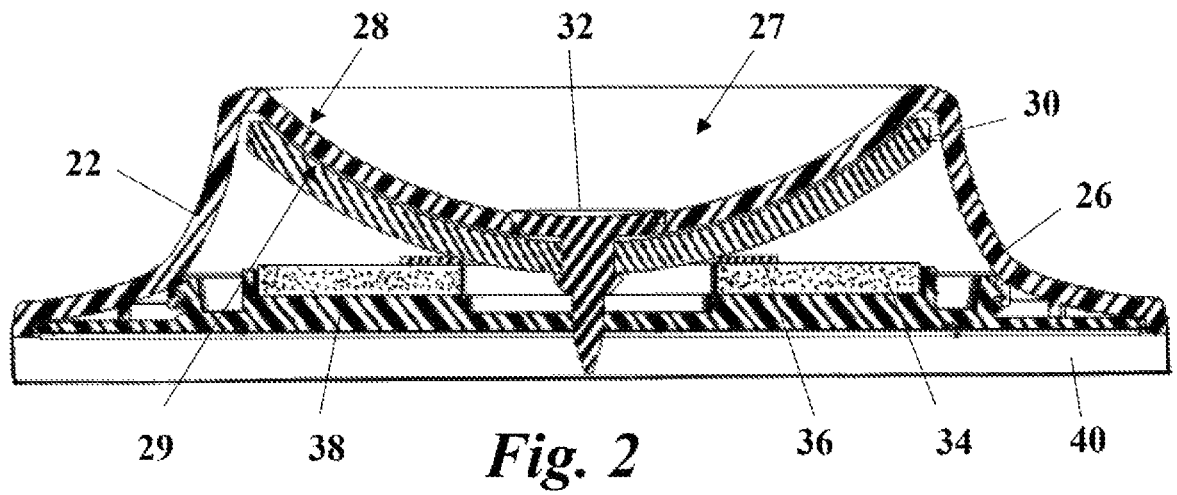
FIG. 2 is a cross-sectional depiction of the base portion of the stand of FIG. 1.
Figure 3:
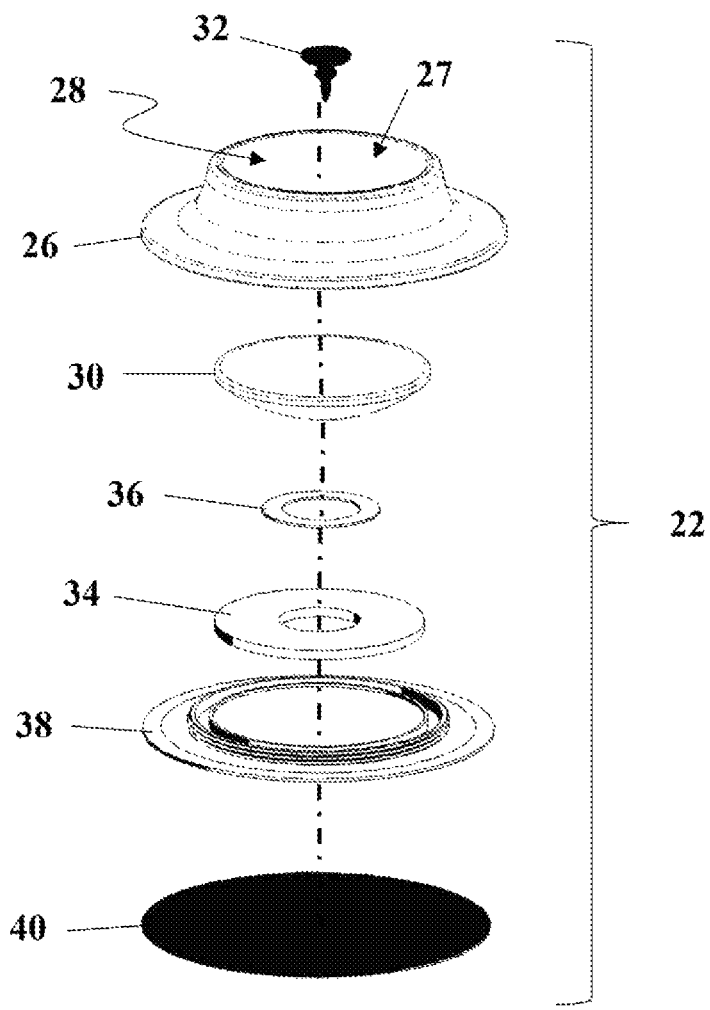
FIG. 3 is an exploded view of the base portion of the stand of FIG. 1.

In FIGS. 1-20 there is depicted stand 20 according to embodiments of the invention. Stand 20 generally includes base assembly 22 and docking assembly 24. As depicted in the embodiment of FIGS. 2 and 3, base assembly 22 generally includes bearing cup 26 made from plastic or non-ferrous metal and defining upwardly facing recess 27 with a smooth upwardly-facing semi-spherical surface 28 and opposing lower surface 29, attractor bowl 30 made from steel or other ferrous metal, fastener 32, rubber washer 34, metal bearing ring 36, plastic base 38, and rubber disk 40. It will be appreciated that semi-spherical surface 28 may be any other rounded shape such as parabolic. Fastener 32 extends through apertures provided in bearing cup 26, attractor bowl 30, rubber washer 34, bearing ring 36, and plastic base 38 to clamp and hold the assembly together.

Figure 4:
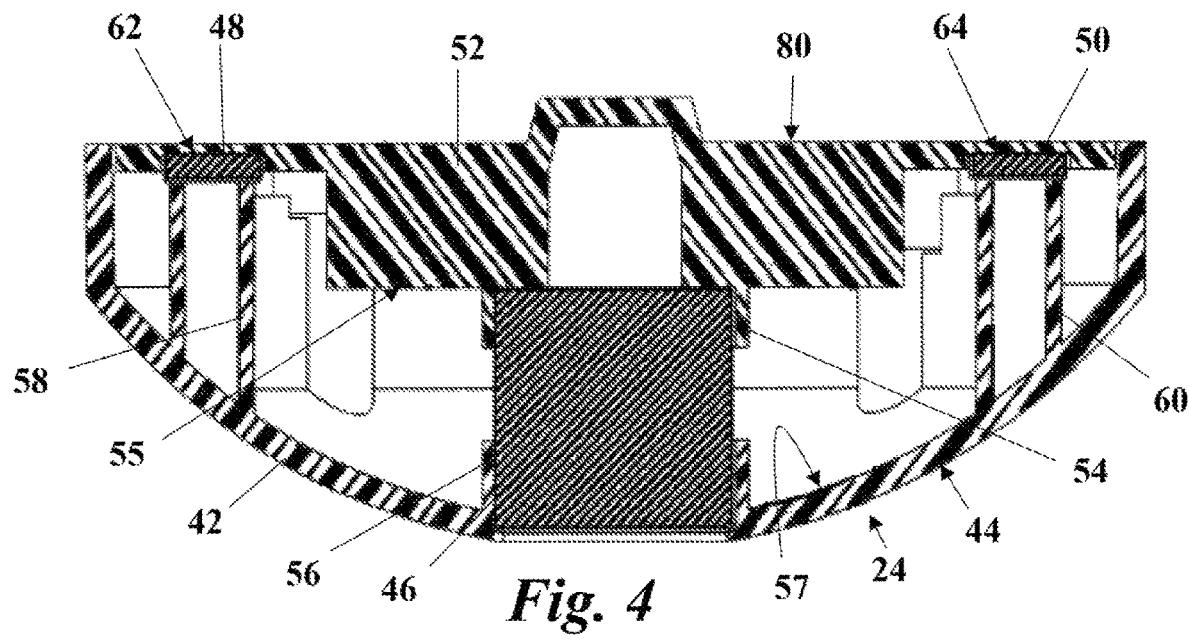
FIG. 4 is a cross-sectional view of a docking assembly according to an embodiment of the invention.
Figure 5:
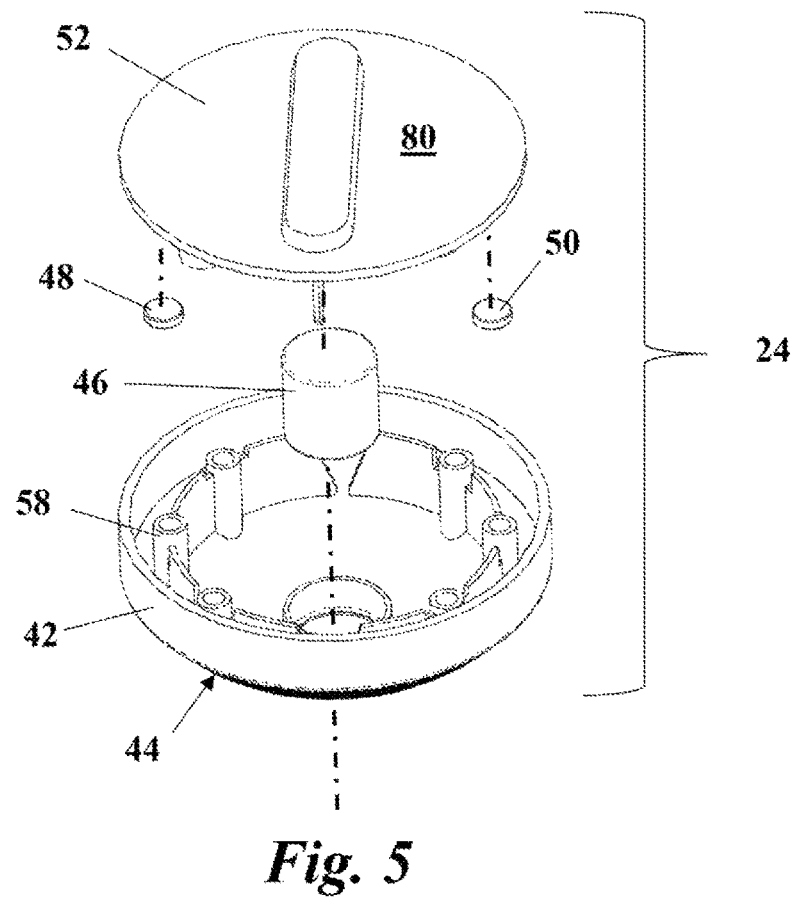
FIG. 5 is an exploded view of the docking assembly of FIG. 4.

In a first embodiment as depicted in FIGS. 4 and 5, docking assembly 24 generally includes cup interface 42 presenting smooth semi-spherical outer surface 44, securing magnet 46, device interface magnets 48, 50, and device interface adapter 52. It will be appreciated that outer surface 44 may also be any other rounded shape conforming with semi-spherical surface 28 of base assembly 22, such as parabolic. Securing magnet 46 is secured in place with retaining structure 54 extending from lower surface 55 of device interface adapter 52 and retaining structure 56 extending from inner surface 57 of cup interface 42. Device interface magnets 48, 50, am supported on bosses 58, 60, extending from cup interface 42, and are received in recesses 62, 64, formed in device interface adapter 52. Cup interface 42 and device interface adapter 52 can be molded from plastic or formed from any other suitable non-magnetic material. Magnets 46, 48, and 50 are preferably high strength neodymium magnets, but can be formed from any magnetic material providing suitable magnetic strength.

Figure 6:
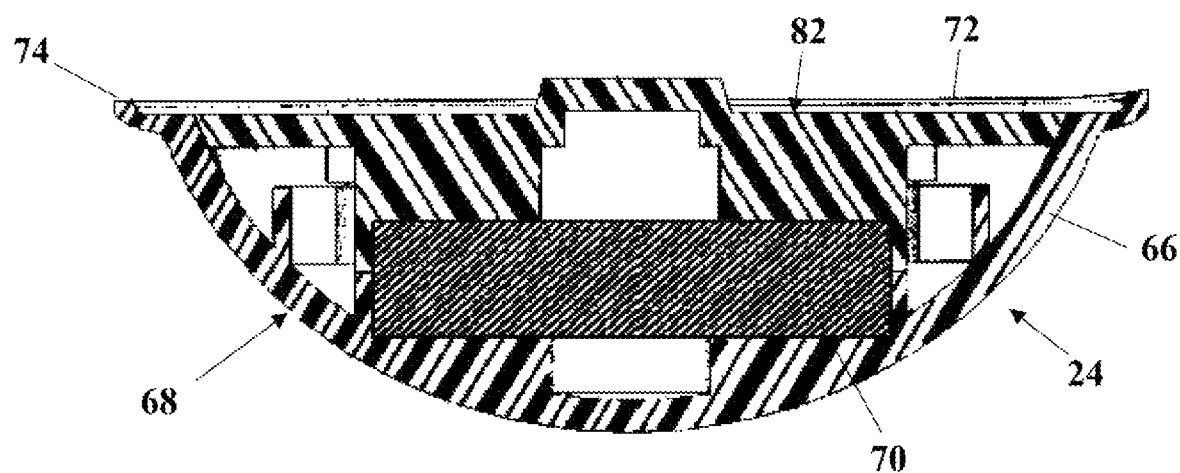
FIG. 6 is a cross-sectional view of a docking assembly according to another embodiment of the invention.
Figure 7:
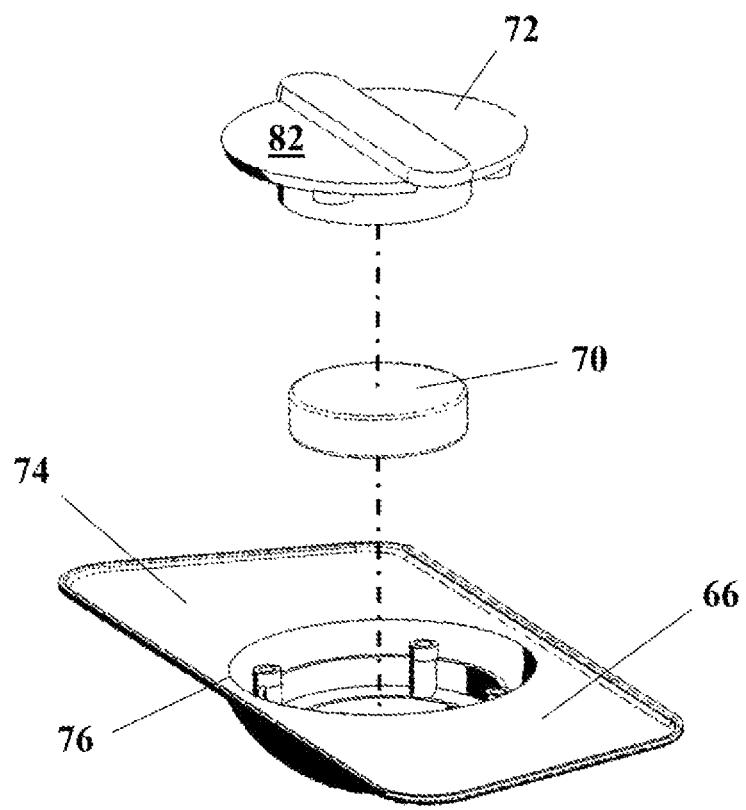
FIG. 7 is an exploded view of the docking assembly of FIG. 6.

In a second embodiment depicted in FIGS. 6 and 7, docking assembly 24 generally includes cup interface 66 presenting smooth semi-spherical outer surface 68, securing magnet 70, and device interface adapter 72. Again, outer surface 68 may also be any other rounded shape conforming with semi-spherical surface 28 of base assembly 22, such as parabolic. Cup interface 66 may have stop portion 74 extending outward from periphery 76 of surface 68. Again, magnet 70 is preferably a high strength neodymium magnet, but can be formed from any magnetic material providing suitable magnetic strength.

Figure 8:
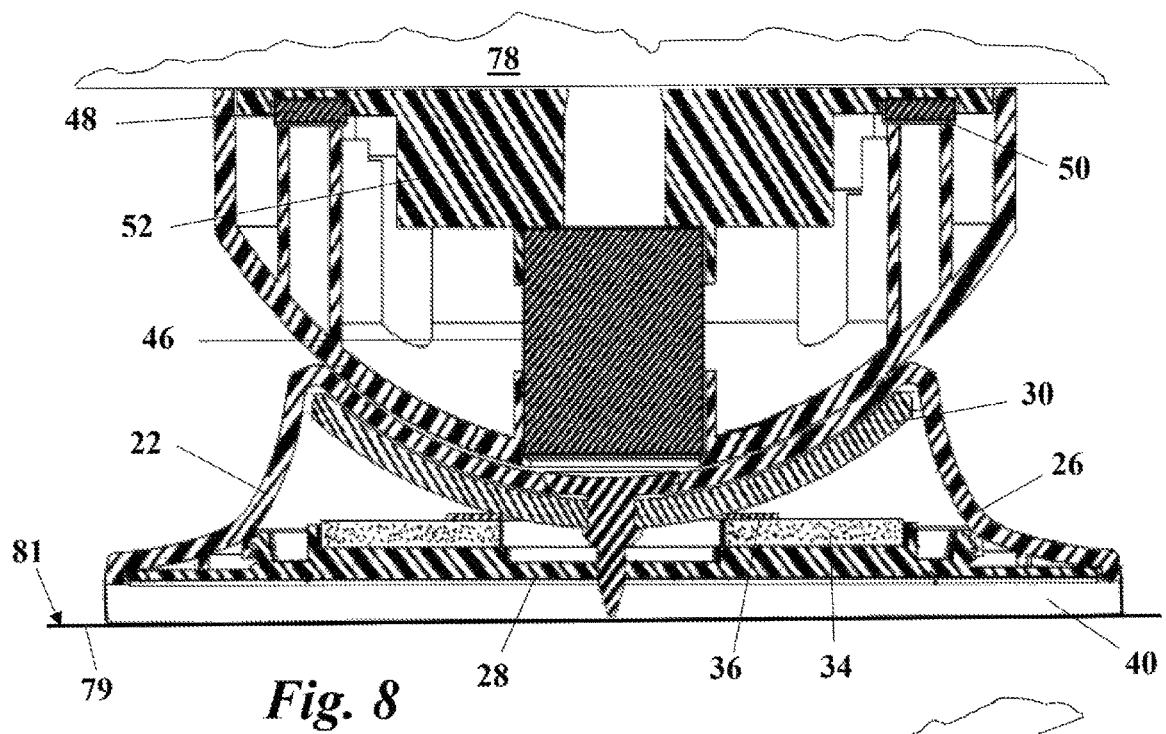
FIG. 8 is a cross-sectional view of the assembled stand of the embodiment of FIGS. 4 and 5 with an electronic device attached.
Figure 9:
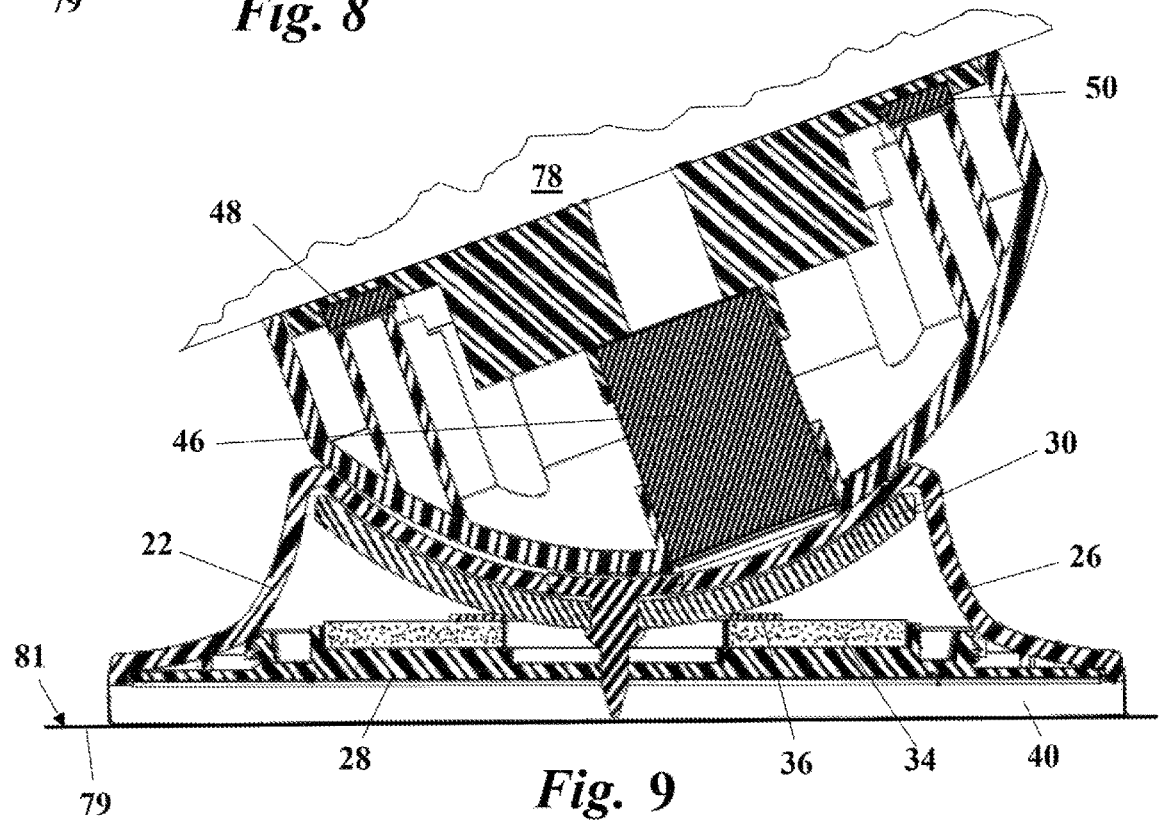
FIG. 9 is a cross-sectional view of the stand of FIG. 8 in a tilted position.

The embodiment of FIGS. 4 and 5 is depicted as assembled and in use in FIGS. 8 and 9. Base assembly 22 is rested on a planar generally horizontal surface such as table 79. Rubber disk 40 provides cushioning and inhibits sliding of base assembly 22 on surface 81 of table 79. Electronic display 78, such as a tablet or smartphone, is received on upper surface 80 of device interface adapter 52. Device interface magnets 48, 50, attract electronic display 78 to hold it in engagement with device interface adapter 52. Alternatively, electronic display 78 can be adhered to device interface adapter 52 with adhesive, hook and loop material, or attached with mechanical fasteners or clamps. Cup interface 42 is rested in bearing cup 26 with outer surface 44 contacting surface 28 to form a ball and socket type connection. Securing magnet 46 attracts attractor bowl 30 to hold base assembly 22 and docking assembly 24 in engagement. As depicted in FIG. 9, electronic display 78 can be positioned in roll, pitch, and yaw by grasping electronic display 78 or cup interface 42 and sliding cup interface 42 in bearing cup 26 until the desired position of electronic display 78 is reached. Due to the attraction between securing magnet 46 and attractor bowl 30, electronic display 78 will remain in position until removed or adjusted to a new position. While attractor bowl 30 is depicted as a rounded integral structure abutting and conforming to lower surface 29 of bearing cup 26, it will be appreciated that attractor bowl 30 could also be formed in alternative shapes such as an inverted truncated pyramid, and could be formed from multiple separate ferrous metal pieces, so long as attractor bowl 30 is disposed in close enough proximity to securing magnet 46 to provide a magnetic attraction sufficient to hold electronic display 78 in position.

Figure 12:
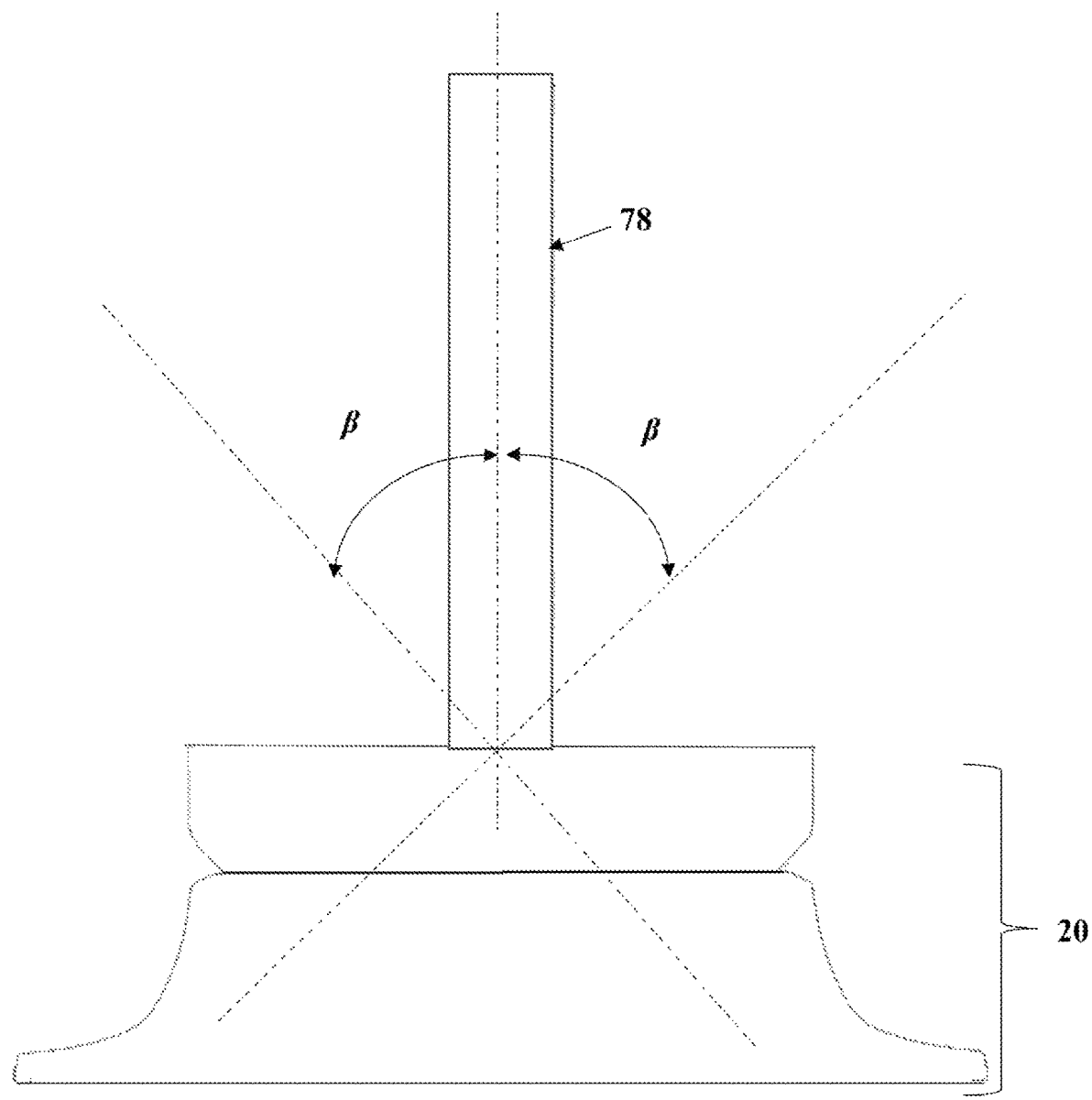
FIG. 12 is a side elevation of a stand according to an embodiment of the invention attached to an electronic display showing the tilt range (pitch) of the stand.
Figure 13:
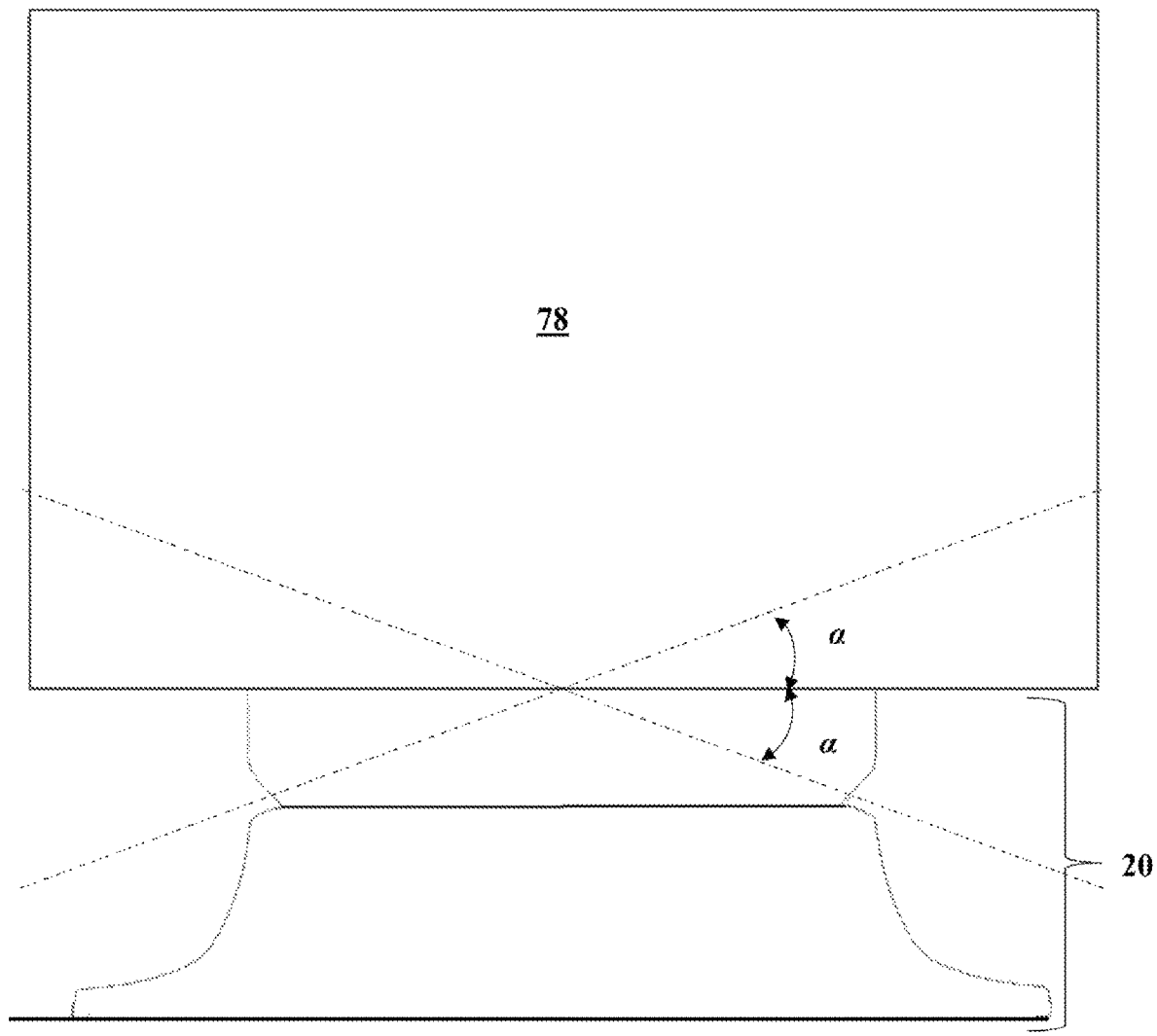
FIG. 13 is a front elevation of a stand according to an embodiment of the invention attached to an electronic display showing the roll range of the stand.
Figure 14:
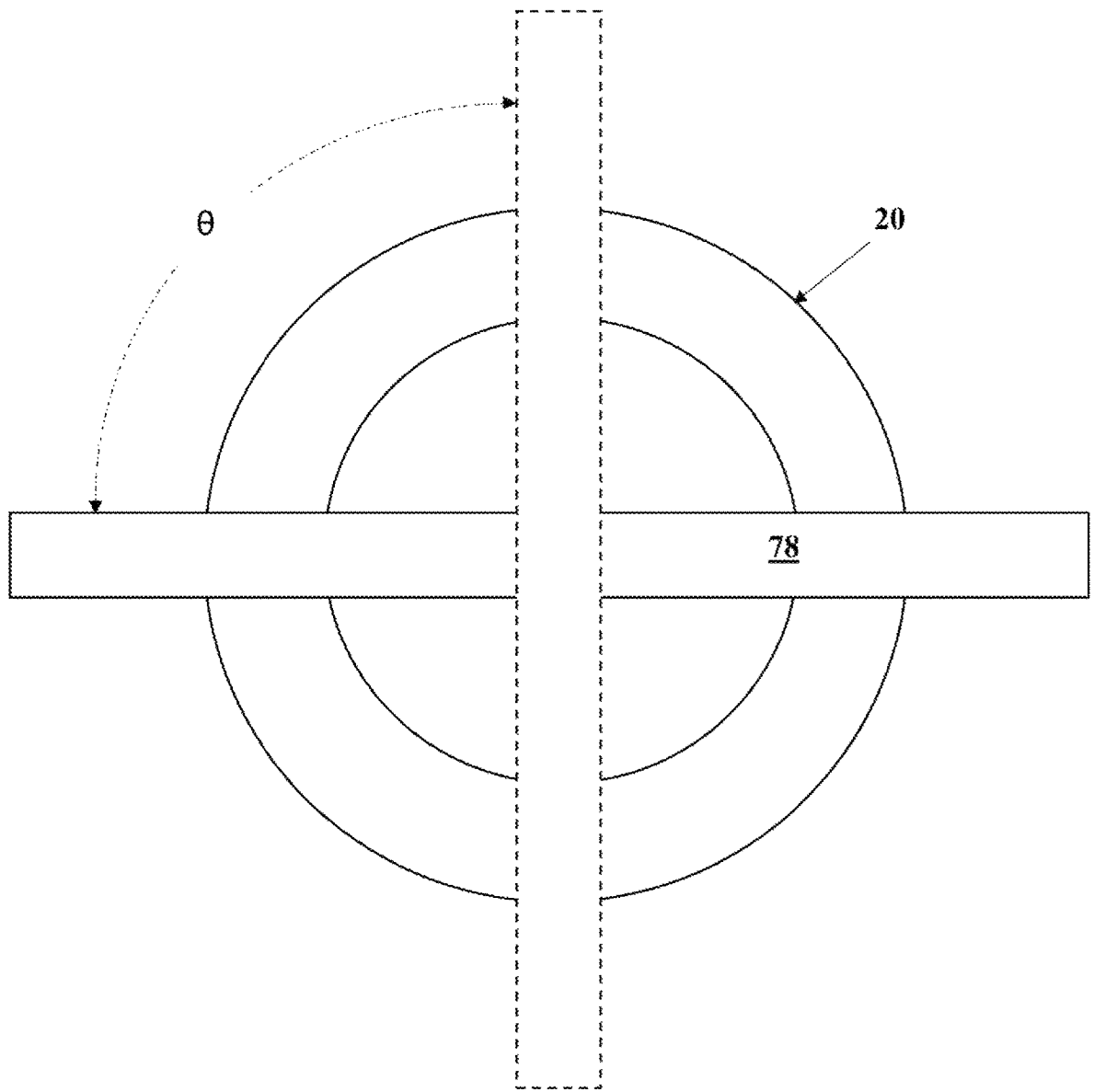
FIG. 14 is a top plan view of a stand according to an embodiment of the invention attached to an electronic display showing the rotation (yaw) range of the stand.

It will be appreciated that electronic display 78 can be detached simply by lifting electronic display 78 off cup interface 42. Stand 20 according to the embodiment of FIGS. 4, 5, 8 and 9, can provide up to +/−50 degrees $\beta$ of tilt range (pitch), +/−25 degrees $\alpha$ of roll range, and 360 degrees $\theta$ of rotation (yaw) for the mounted electronic display device 78 as depicted in FIGS. 12-14.

Figure 10:
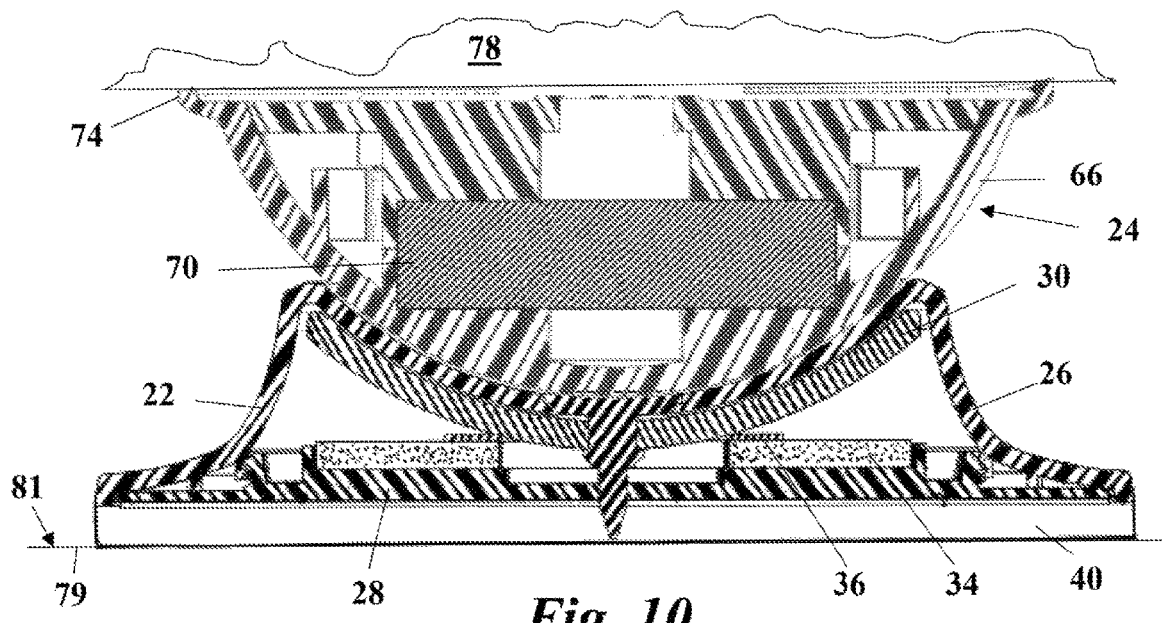
FIG. 10 is a cross-sectional view of the assembled stand of the embodiment of FIGS. 6 and 7 with an electronic device attached.
Figure 11:
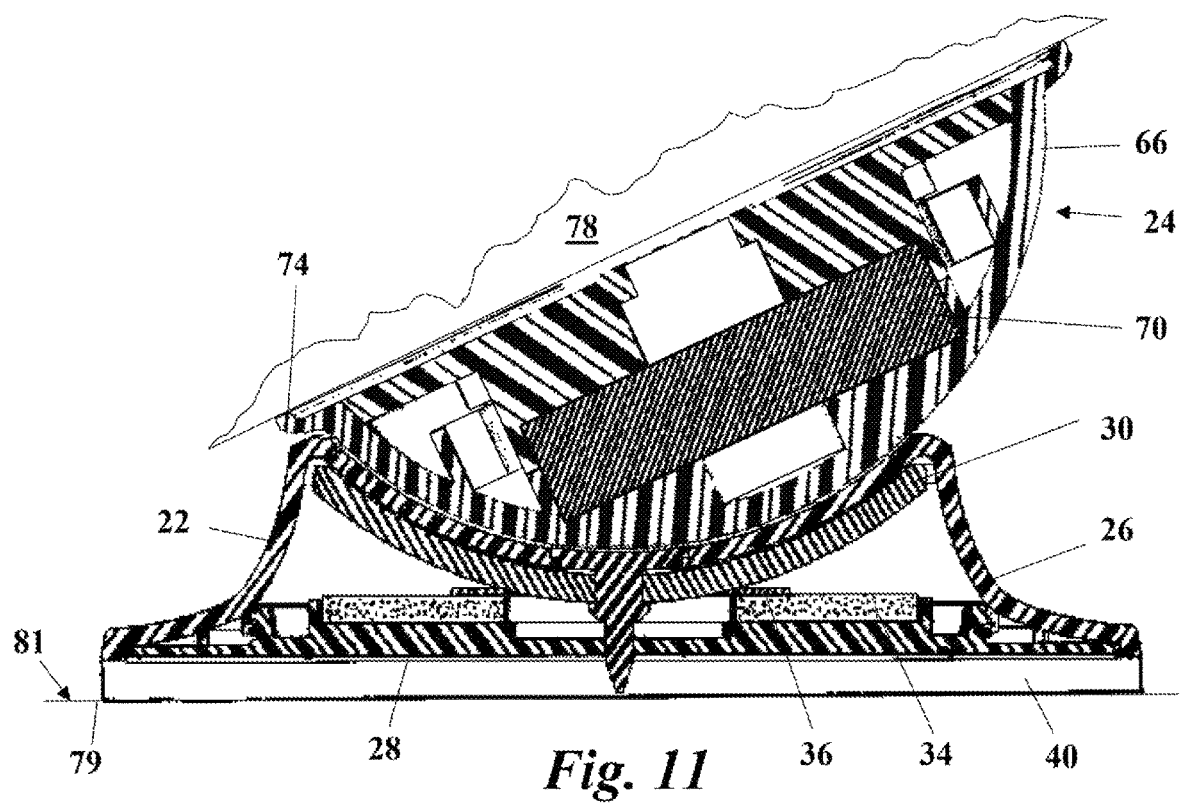
FIG. 11 is a cross-sectional view of the stand of FIG. 10 in a tilted position.

The embodiment of FIGS. 6 and 7 is depicted as assembled and in use in FIGS. 10 and 11. Electronic display 78, such as a tablet or smartphone, is received on upper surface 82 of device interface adapter 72 and secured in place with magnets, adhesive, hook and loop material, mechanical fasteners, or clamps. Rubber disk 40 provides cushioning and inhibits sliding of base assembly 22 on surface 81 of table 79. Cup interface 66 is rested in bearing cup 26 with outer surface 69 contacting surface 28 to form a ball and socket type connection. Securing magnet 70 attracts attractor bowl 30 to hold base assembly 22 and docking assembly 24 in engagement. As depicted in FIG. 11, electronic display 78 can be positioned in roll, pitch, and yaw by grasping electronic display 78 or cup interface 66 and sliding cup interface 66 in bearing cup 26 until the desired position of electronic display 78 is reached. Due to the attraction between securing magnet 70 and attractor bowl 30, electronic display 78 will remain in position until removed or adjusted to a new position. Again, while attractor bowl 30 is depicted as a rounded integral structure abutting and conforming to lower surface 29 of bearing cup 26, it will be appreciated that attractor bowl 30 could also be formed in alternative shapes such as an inverted truncated pyramid, and could be formed from multiple separate ferrous metal pieces, so long as attractor bowl 30 is disposed in close enough proximity to securing magnet 70 to provide a magnetic attraction sufficient to hold electronic display 78 in position.

It will be appreciated that electronic display 78 can be detached simply by removing it from device interface adapter 72. In the depicted embodiment, stand 120 offers up to +/−25 degrees $\beta$ of tilt range (pitch), +/−25 degrees $\alpha$ of roll range, and 360 degrees $\theta$ of rotation (yaw) for the mounted display device 78 as depicted in FIGS. 12-14.

In FIGS. 15-20, stand 120 is depicted according to additional embodiments of the invention. Stand 120 generally includes base assembly 122 and docking assembly 124. As depicted in a first embodiment in FIGS. 15, 16 and 17, base assembly 122 generally includes attractor bowl 126 made from steel or other ferrous metal and defining upwardly facing recess 128 with a smooth upwardly-facing semi-spherical surface 130, fastener 132, washer 134, outer shell 136, base 138, and o-ring 140. It will be appreciated that semi-spherical surface 130 may be any other rounded shape such as parabolic. Fastener 132 extends through apertures provided in attractor bowl 126, washer 134, and base 138 to clamp and hold the assembly together.

Figure 15:
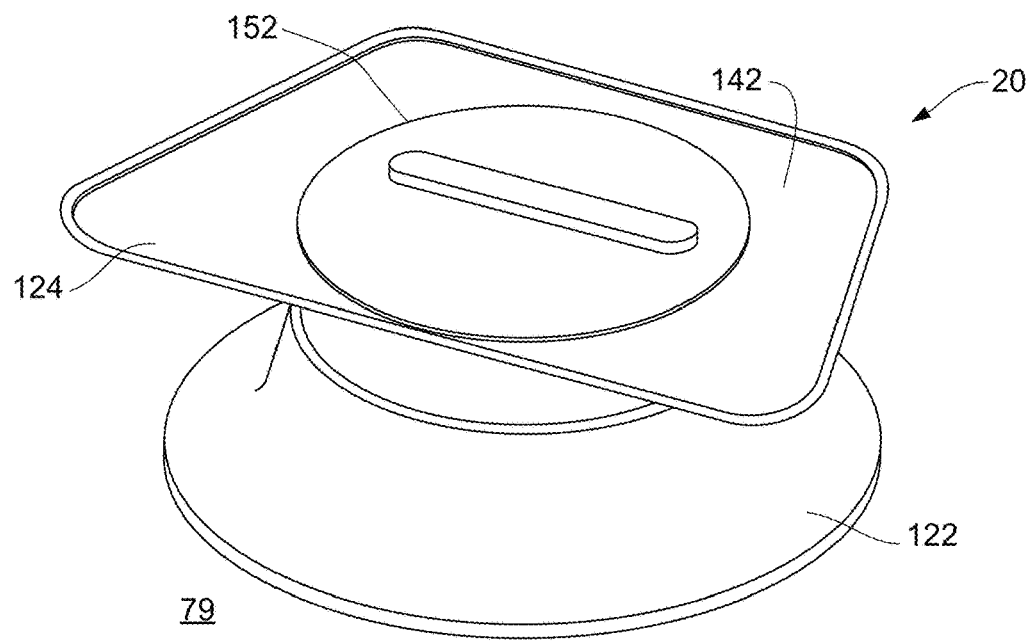
FIG. 15 is an isometric view of another embodiment of the invention.
Figure 16:
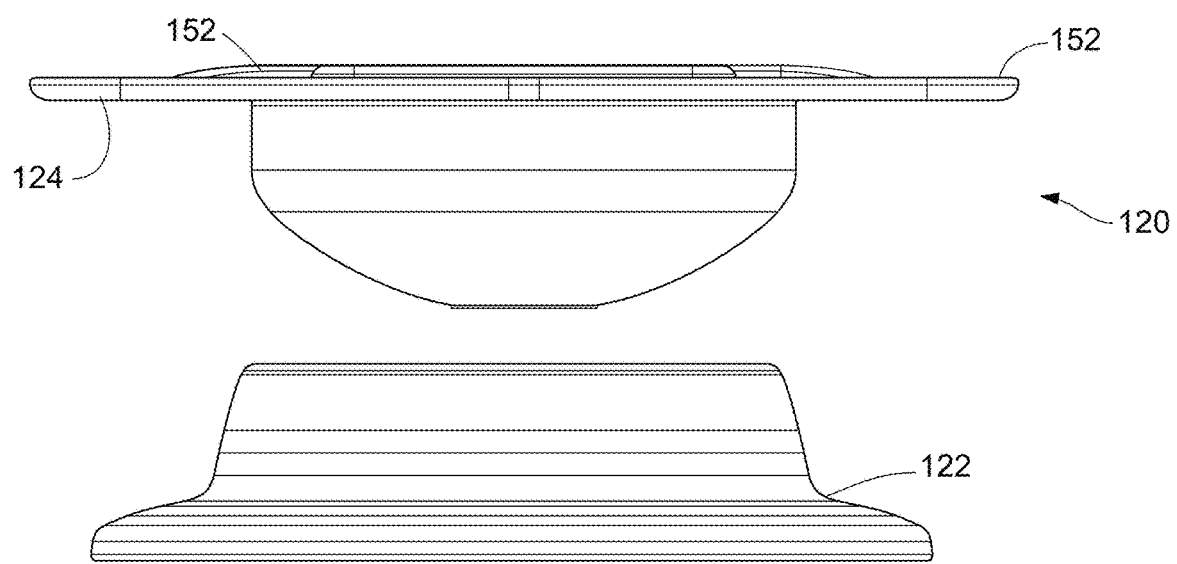
FIG. 16 is a partially exploded front elevation view of the embodiment of FIG. 15.
Figure 17:
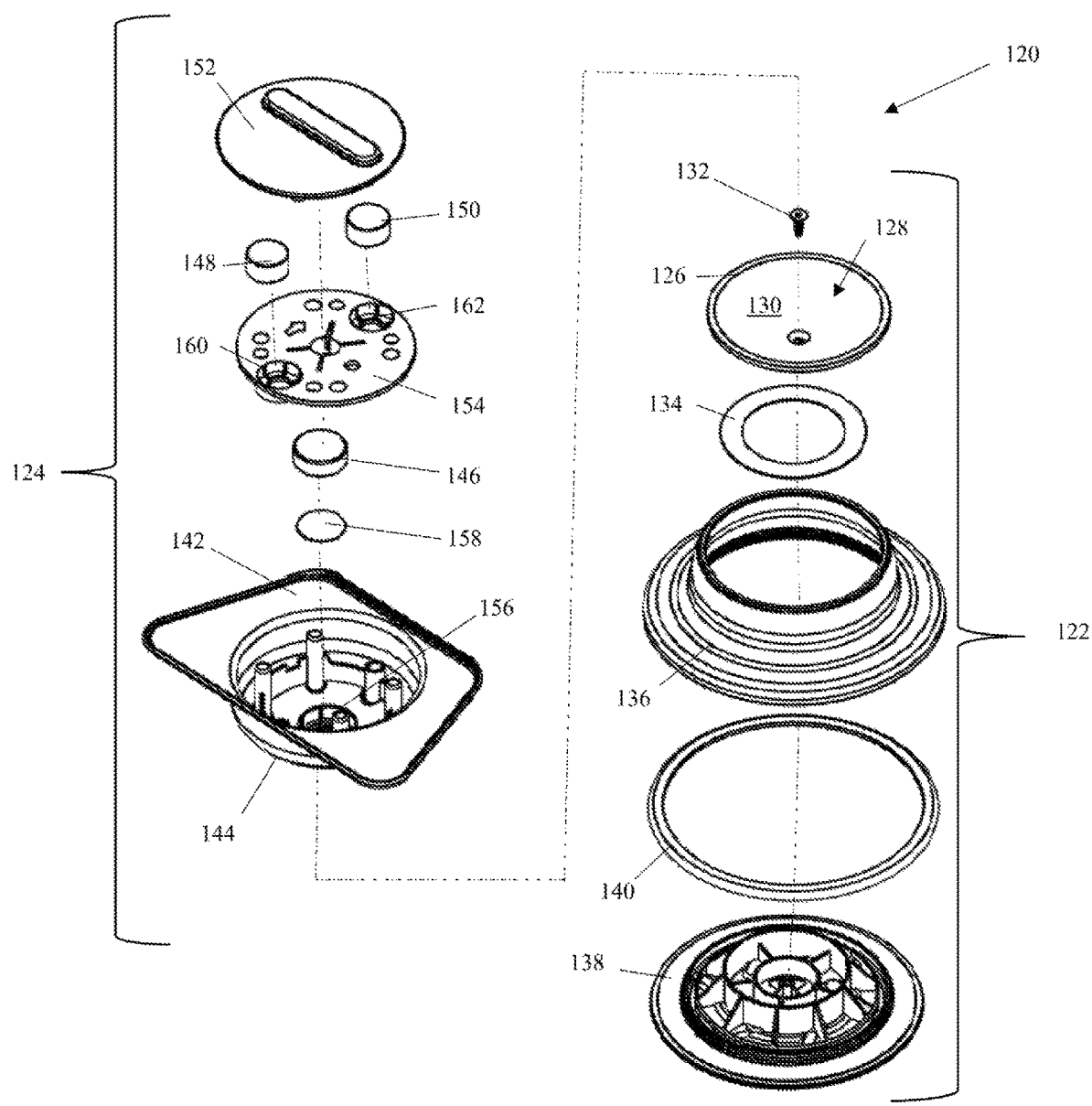
FIG. 17 is an exploded view of the embodiment of FIG. 15.

In the embodiment of FIGS. 15, 16, and 17 docking assembly 124 generally includes cup interface 142 presenting smooth semi-spherical outer surface 144, securing magnet 146, device interface magnets 148, 150, device interface adapter 152, and magnet retainer 154. It will be appreciated that outer surface 144 may also be any other rounded shape conforming with semi-spherical surface 130 of base assembly 122, such as parabolic. Securing magnet 146 is secured in place in central recess 156 of cup interface 142 with adhesive disk 158. Device interface magnets 148, 150, are received in recesses 160, 162, defined in magnet retainer 154. Cup interface 142 and device interface adapter 152 can be molded from plastic or formed from any other suitable non-magnetic material. Magnets 146, 148, and 150 are preferably high strength neodymium magnets, but can be formed from any magnetic material providing suitable magnetic strength.

Figure 18:
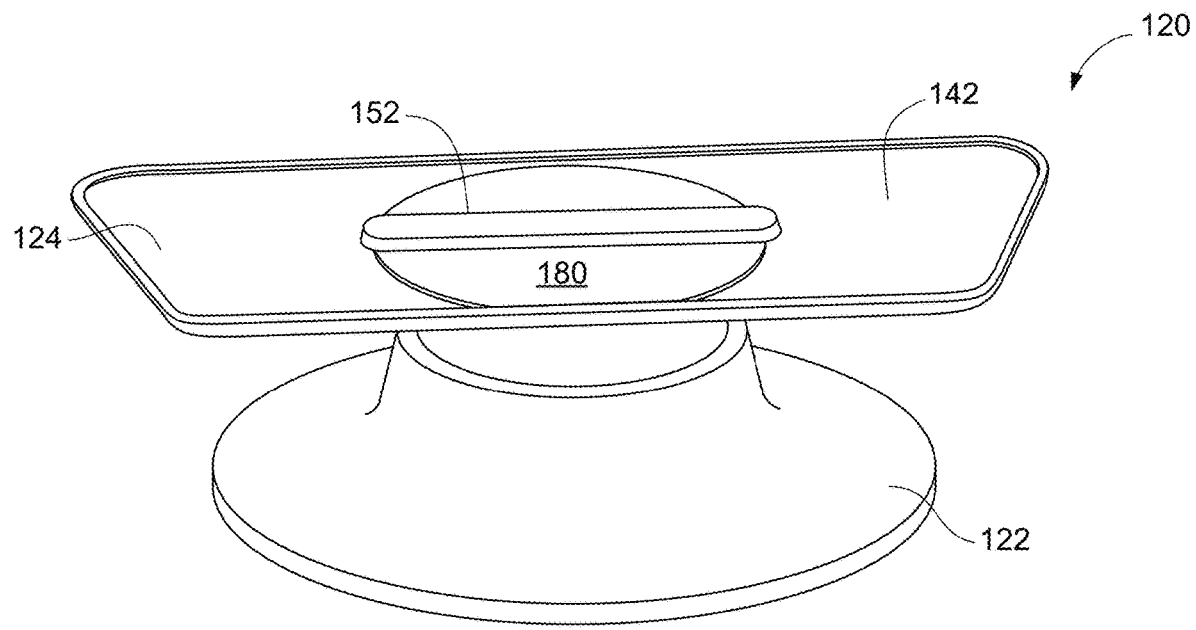
FIG. 18 is an isometric view of another embodiment of the invention.
Figure 19:
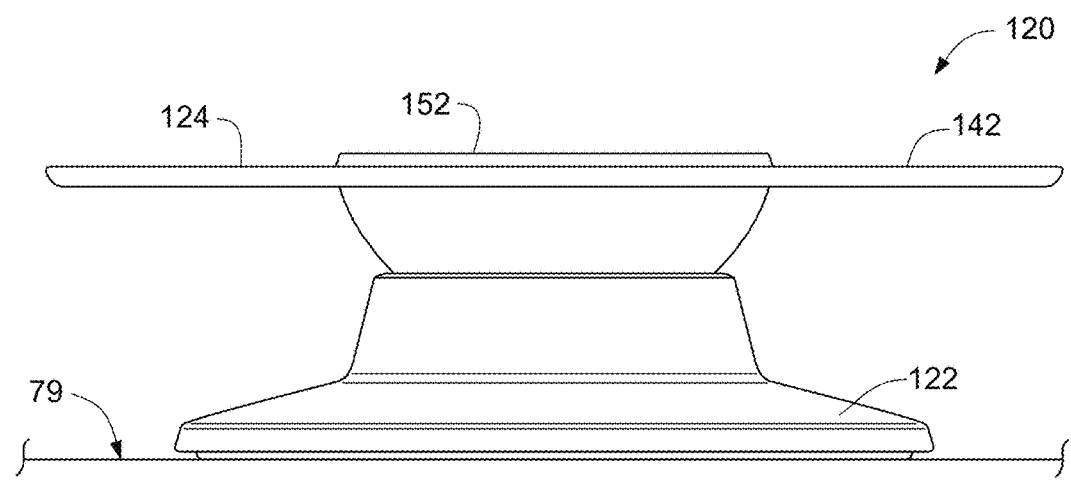
FIG. 19 is a front elevation view of the embodiment of FIG. 18.
Figure 20:
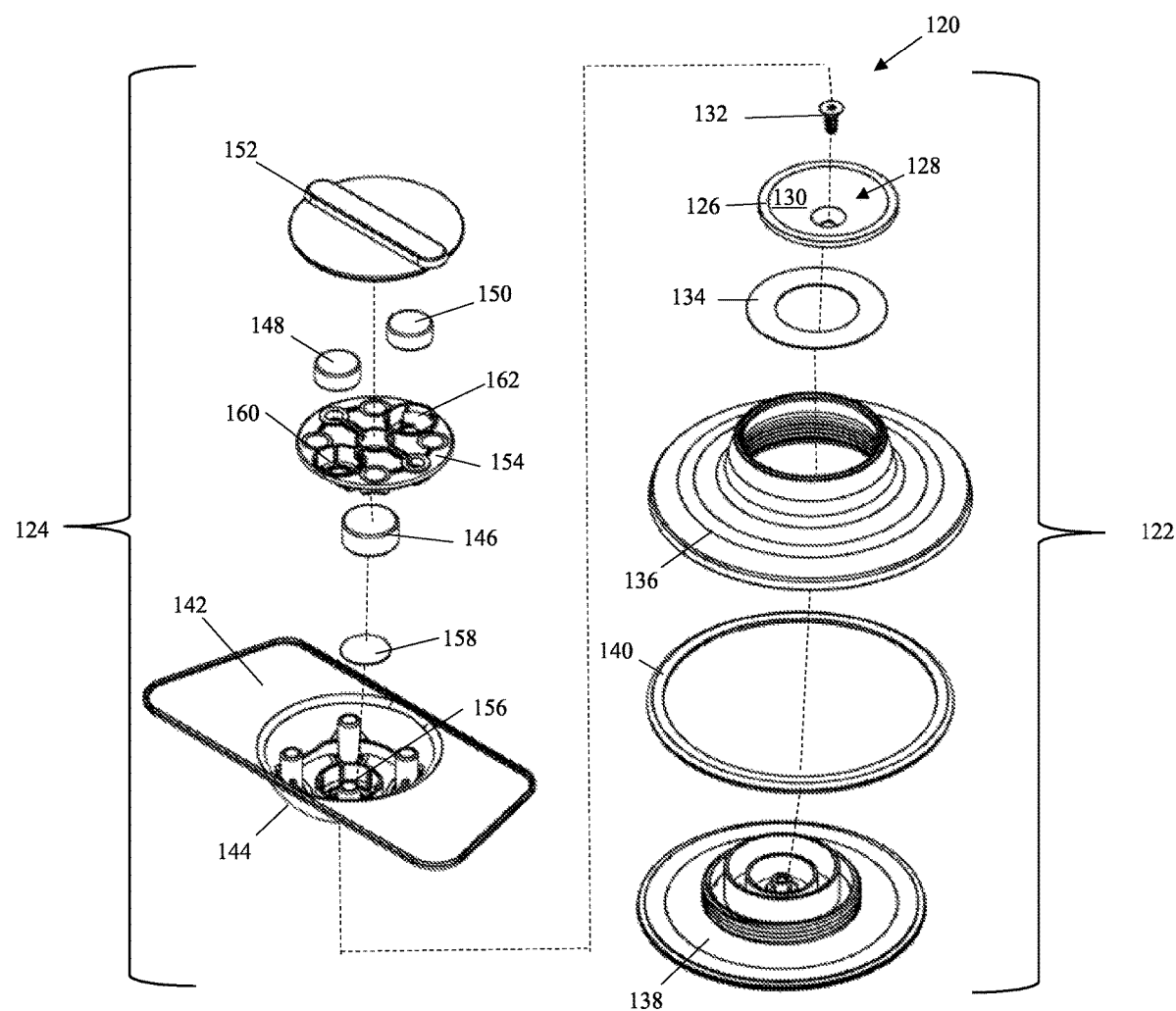
FIG. 20 is an exploded view of the embodiment of FIG. 18.

In a second embodiment depicted in FIGS. 18, 19 and 20, base assembly 122 generally includes attractor bowl 126 made from steel or other ferrous metal and defining upwardly facing recess 128 with a smooth upwardly-facing semi-spherical surface 130, fastener 132, washer 134, outer shell 136, base 138, and o-ring 140. It will be appreciated that semi-spherical surface 130 may be any other rounded shape such as parabolic. Fastener 132 extends through apertures provided in attractor bowl 126, washer 134, and base 138 to clamp and hold the assembly together.

In the embodiment of FIGS. 18, 19, and 20 docking assembly 124 generally includes cup interface 142 presenting smooth semi-spherical outer surface 144, securing magnet 146, device interface magnets 148, 150, device interface adapter 152, and magnet retainer 154. It will be appreciated that outer surface 144 may also be any other rounded shape conforming with semi-spherical surface 130 of base assembly 122, such as parabolic. Securing magnet 146 is secured in place in central recess 156 of cup interface 142 with adhesive disk 158. Device interface magnets 148, 150, are received in recesses 160, 162, defined in magnet retainer 154. Cup interface 142 and device interface adapter 152 can be molded from plastic or formed from any other suitable non-magnetic material. Magnets 146, 148, and 150 are preferably high strength neodymium magnets, but can be formed from any magnetic material providing suitable magnetic strength.

The embodiments of FIGS. 15-20 are depicted as assembled in FIGS. 15 and 18. Base assembly 122 is rested on a planar generally horizontal surface such as a table or desk 79. An electronic display (not depicted), such as a tablet or smartphone, is received on upper surface 180 of device interface adapter 152. Device interface magnets 148, 150, attract the electronic display to hold it in engagement with device interface adapter 152. Alternatively, the electronic display can be adhered to device interface adapter 152 with adhesive, hook and loop material, or attached with mechanical fasteners or clamps. Cup interface 142 is rested in attractor bowl 126 to form a ball and socket type connection. Securing magnet 146 attracts attractor bowl 126 to hold base assembly 122 and docking assembly 124 in engagement. The electronic display can be positioned in roll, pitch, and yaw by grasping the electronic display or cup interface 142 and sliding cup interface 142 in attractor bowl 126 until the desired position of the electronic display is reached. Due to the attraction between securing magnet 146 and attractor bowl 126, the electronic display will remain in position until removed or adjusted to a new position.

It will be appreciated that the electronic display can be detached simply by lifting it off cup interface 142. Again, stand 120 according to the embodiments of FIGS. 15-20, can provide up to +/−50 degrees β of tilt range (pitch), +/−25 degrees α of roll range, and 360 degrees θ of rotation (yaw) for the mounted electronic display device as depicted in FIGS. 12-14.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from: different individual embodiments, as understood by persons of ordinary skill in the art. Moreover, elements described with respect to one embodiment can: be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims, Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, if is expressly intended that the provisions of 35 U.S.C. § 112(t) are not to be invoked unless the specific terms "means for" or "step for" are recited in a claim.

What is claimed is:

1. A stand for an electronic display device comprising:
   a base assembly including a non-magnetic bearing cup defining an upwardly facing rounded recess presenting a smooth upwardly facing surface and an opposing lower surface, and an attractor bowl made from ferrous material disposed proximate the lower surface; and
   a docking assembly including a cup interface presenting a smooth rounded outer surface portion conformingly shaped to the recess of the bearing cup, a securing magnet, and a device interface adapter adapted to receive the electronic display device, wherein the rounded outer surface portion of the cup interface is received in the recess of the bearing cup and is slidable on the smooth upper surface of the bearing cup to enable selective positioning of the cup interface relative to the base assembly in roll, pitch, and yaw, and wherein the securing magnet attracts the attractor cup to secure the docking assembly in engagement with the base assembly.

2. The stand of claim 1, wherein the docking assembly further comprises at least one device interface magnet adapted to attract the electronic display device to hold the electronic display device in engagement with the device interface adaptor.

3. The stand of claim 2, wherein the at least one device interface magnet is a high strength neodymium magnet.

4. The stand of claim 1, wherein the securing magnet is a high strength neodymium magnet.

5. The stand of claim 1, wherein the base assembly further comprises a plastic base operably coupled to the bearing cup, the attractor bowl disposed between the bearing cup and the plastic base.

6. The stand of claim 1, wherein the electronic display, when attached to the device interface adapter, is selectively shiftable in a range of about +/−50 degrees of pitch relative to the base assembly.

7. The stand of claim 1, wherein the electronic display, when attached to the device interface adapter, is selectively shiftable in a range of about +/−25 degrees of roll relative to the base assembly.

8. The stand of claim 1, wherein the electronic display, when attached to the device interface adapter, is selectively shiftable in a range of about 360 degrees of yaw relative to the base assembly.

9. The stand of claim 1, wherein the outer surface portion of the cup interface is semi-spherical.

10. A docking system for a portable electronic device comprising:
    a base including a non-magnetic bearing cup and an attractor bowl made from ferrous material disposed proximate a lower surface of the bearing cup; and
    a docking assembly including a cup interface slidably mated with the bearing cup so as to form a ball and socket connection, the docking assembly further including a securing magnet and a device interface adapted to receive the portable electronic device, the securing magnet magnetically attracting the attractor bowl to retain the cup interface in engagement with the bearing cup, the cup interface selectively slidable in the bearing cup to enable selective positioning of the bearing cup relative to the base assembly in roll, pitch, and yaw.

11. The system of claim 10, wherein the docking assembly further comprises at least one device interface magnet adapted to attract the portable electronic device to hold the portable electronic device in engagement with the docking assembly.

12. The system of claim 11, wherein the at least one device interface magnet is a high strength neodymium magnet.

13. The system of claim 10, wherein the securing magnet is a high strength neodymium magnet.

14. The system of claim 10, wherein the base further comprises a plastic base operably coupled to the bearing cup, the attractor bowl disposed between the bearing cup and the plastic base.

15. The system of claim 10, wherein the portable electronic device, when attached to the docking assembly, is selectively shiftable in a range of about +/−50 degrees of pitch relative to the base.

16. The system of claim 10, wherein the portable electronic device, when attached to the docking assembly, is selectively shiftable in a range of about +/−25 degrees of roll relative to the base.

17. The system of claim 10, wherein the portable electronic device, when attached to the docking assembly, is selectively shiftable in a range of about 360 degrees of yaw relative to the base.

18. A portable electronic display system comprising:
a portable electronic device; and
a docking system for receiving the portable electronic device, the docking system comprising:
  a base including an attractor bowl made from ferrous material; and
  a docking assembly including a cup interface slidably mated with the attractor bowl so as to form a ball and socket connection, the docking assembly further including a securing magnet and a device interface receiving the portable electronic device, the securing magnet magnetically attracting the attractor bowl to retain the cup interface in engagement with a bearing cup, the cup interface selectively slidable in the bearing cup to enable selective positioning of the bearing cup relative to the base assembly in roll, pitch, and yaw.

19. The system of claim 18, wherein the docking assembly further comprises at least one device interface magnet adapted to attract the portable electronic device to hold the portable electronic device in engagement with the docking assembly.

20. The system of claim 18, wherein the portable electronic device, when attached to the docking assembly, is selectively shiftable in a range of about +/−50 degrees of pitch, about +/−25 degrees of roll, and/or about 360 degrees of yaw relative to the base.

21. A docking stand for a portable electronic device, the docking stand comprising:
a base including an attractor bowl made from ferrous material; and
a docking assembly including a cup interface slidably mated with the attractor bowl so as to form a ball and socket connection, the docking assembly further including a securing magnet and a device interface receiving the portable electronic device, the securing magnet magnetically attracting the attractor bowl to retain the cup interface in engagement with a bearing cup, the cup interface selectively slidable in the bearing cup to enable selective positioning of the bearing cup relative to the base assembly in roll, pitch, and yaw.

22. The docking stand of claim 21, wherein the docking assembly further comprises at least one device interface magnet adapted to attract the portable electronic device to hold the portable electronic device in engagement with the docking assembly.

23. The docking stand of claim 21, wherein the portable electronic device, when attached to the docking assembly, is selectively shiftable in a range of about +/−50 degrees of pitch, about +/−25 degrees of roll, and/or about 360 degrees of yaw relative to the base.

* * * * *